J. O. TABER.
HARVESTER DROPPER.

No. 103,796.  Patented May 31, 1870.

Witnesses  
J. O. Taber  
by his Attorney  
A. M. Smith

200~# United States Patent Office.

J. OSCAR TABER, OF SALEM, OHIO.

Letters Patent No. 103,796, dated May 31, 1870.

IMPROVEMENT IN HARVESTER-DROPPERS.

The Schedule referred to in these Letters Patent and making part of the same

*To all whom it may concern:*

Be it known that I, J. OSCAR TABER, of Salem, county of Columbiana, State of Ohio, have invented certain new and useful Improvements in Harvester-Droppers, of which the following is a full, clear, and exact description, reference being had to the accompanying drawing making part of this specification, in which—

Figure 1:
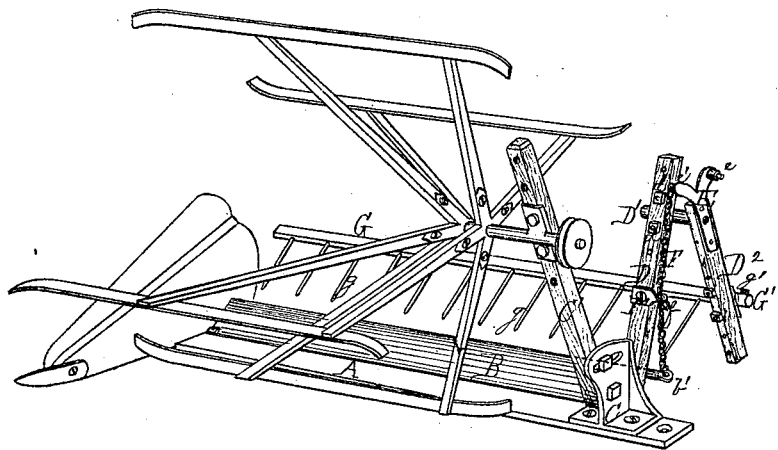
Figure 1 is a perspective view of my improved dropper.

Droppers may be properly divided into three general classes, to wit:

One class, including those in which the platform upon which the grain falls, is moved bodily from its position in rear of the cutting apparatus, and then tilted or dumped for the purpose of discharging the grain.

Another class includes those in which the receiving platform is not removed from its place in rear of the cutters, but deposits the grain directly in the path of the machine on its next round.

In both these classes there are means provided for receiving the grain during the time while the platform is being dumped, such means consisting generally of a vibrating cut-off which is interposed in the rear of the falling grain, thereby sustaining it (the grain) in a nearly vertical position until the platform is ready to receive it.

In droppers belonging to the third general division, there is no dumping or tilting platform upon which the grain lies in a horizontal position, while enough is being collected to form a gavel, but in this construction the grain is maintained in nearly an upright position, or in some machines at an inclination of about forty-five degrees, until it is ready for delivery, when it is suddenly dropped upon the ground without the aid of an intervening platform.

In these droppers the butts of the straw rest upon either the cutter-bar or upon a narrow strip in the rear of it, and are supported against the backward thrust of the reel by means of various devices.

It is believed that this kind of dropper has heretofore been rendered practically inoperative, through certain defects which allow the grain to struggle and tangle before and during its delivery; and it is to remedy these difficulties and render the discharge of the grain free and uniform, and to lay it in a compact form, that I have invented these improvements, which consist in a novel construction and arrangement of parts, whereby the dropper may be easily operated and readily adapted to the varying kind and condition of the crop to be cut, as will be hereinafter explained.

In the drawing—

A represents a narrow ledge or strip, immediately in rear of the cutters, upon which the butts of the straw rest, as is usual in this class of droppers.

B is a wing-board, or vibrating fender, in rear of and parallel to the strip A. The fender B is hinged at or near its front edge, leaving its rear edge free to vibrate, as and for the purpose hereinafter explained.

C is a metallic plate, furnishing a support for the reel-post C', and also for post D.

As the reel which I prefer to employ with my dropper is one of ordinary overhung reels, I do not deem it necessary to give a detailed description of it.

$D^1$ is a tubular bearing or rest, adjustably attached to post D, by means of bolts $d$, or their equivalents.

$D^2$ is an arm, made preferably of wood and mounted upon a shaft, $d'$, which turns freely in tubular bearing $D^1$, so that arm $D^2$ can oscillate freely about shaft $d'$ as a center.

E is a forked piece, usually made of metal, rigidly secured to arm $D^2$, forming a heel extension of said arm, and provided at the upper ends of its legs with either perforations or with wrists $e\ e'$, as shown in the drawing.

F is a chain or link, connected at one end with arm $D^2$ by means of forked piece E, at $e'$, and at the other end with fender or wing B, by means of a shank or stem $b'$, formed upon or attached to said fender.

F' is a guide secured to post D, and is provided at one end with a perforation, through which chain F passes, as shown in fig. 1.

$f$ is a ring or clevis, fastened to chain F by being passed through one of the links. This ring or clevis is so large that it cannot pass through the perforation in the end of guide F'.

The platform of my dropper is constructed as follows:

G is a rib or head attached to arm $D^2$ by suitable devices in such manner that it (the rib) can be adjusted at various distances from the end of said arm, as shown in the drawing.

In the method which I have adopted for mounting head G, I employ a socket G', in which is inserted either the rounded end of the head or a forked metallic shank, which is held tightly in place by means of one or more set screws $g'$.

$g\ g$ are slats, bars, or fingers, projecting from head G at about a right angle from arm $D^2$.

The tubular bearing $D^1$ is also adjustable vertically on post D, as shown in the drawing.

Figure 2:
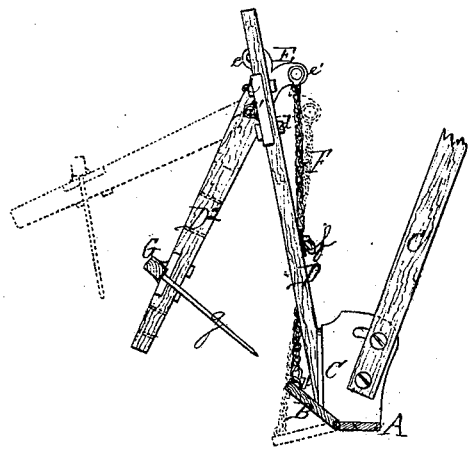
Figure 2 is an end view with the reel removed.

The operation of my dropper will be readily understood. It may be operated either by foot, by hand, or automatically, through any suitable device connected with arm $D^2$, at $e$, or at any other convenient point. When the parts are in the position indicated in fig. 1, and by full lines in fig. 2, they are ready to receive the grain as it is thrown upon them from the reel. As soon as enough shall have collected to form a gavel, arm $D^2$ and the platform are thrown up into the position indicated by dotted lines in fig. 2, and the wing piece or fender is at the same time dropped into its position, as shown in dotted lines fig. 2, by the slackening up of the chain or link F. Thus, all support is simultaneously removed from both ends of the straw, allowing it to drop instantly and without any restraint.

After the grain has been discharged, the platform is permitted to descend, its fall being checked by ring $f$ coming in contact with the under side of guide F'.

The combination of devices which I have invented also renders it easy to adapt the dropper to the kind and condition of the crop, as, for instance, if the grain be tall and of uniform height, so that it is advisable not to have the head of the platform descend to so low a point, I can move it higher up on arm $D^2$, and then, by means of set-screws $g'$, make the pitch of slats or fingers conform to their changed position.

I can effect a similar change in the working relation of the parts by means of ring $f$, by removing it from one link and placing it in another, it thus serving as an adjustable stop.

It is obvious that in case I use a rod or link in place of chain F, I can easily attach an adjustable stop instead of ring $f$.

Having now described my invention,

What I claim as new, and desire to secure by Letters Patent, is—

1. The combination of arm $D^2$ which carries the platform, link, or chain F, and wing-board or fender B, arranged and operating substantially as set forth.

2. The combination of arm $D^2$, adjustable socket G', rib or head G, and set-screw $g'$, whereby the platform may be raised or lowered, while at the same time a proper inclination of the teeth or slats $g$ toward the fender B may be maintained.

3. The combination of arm $D^2$, fender B, chain or link F', and adjustable stop $f$.

J. OSCAR TABER.

Witnesses:
 EDWARD KENNETT,
 THOMAS KENNETT.